May 9, 1933.  A. O. HERRON  1,908,244
INNER TUBE FOR VEHICLE TIRES
Filed Sept. 5, 1931  2 Sheets-Sheet 1
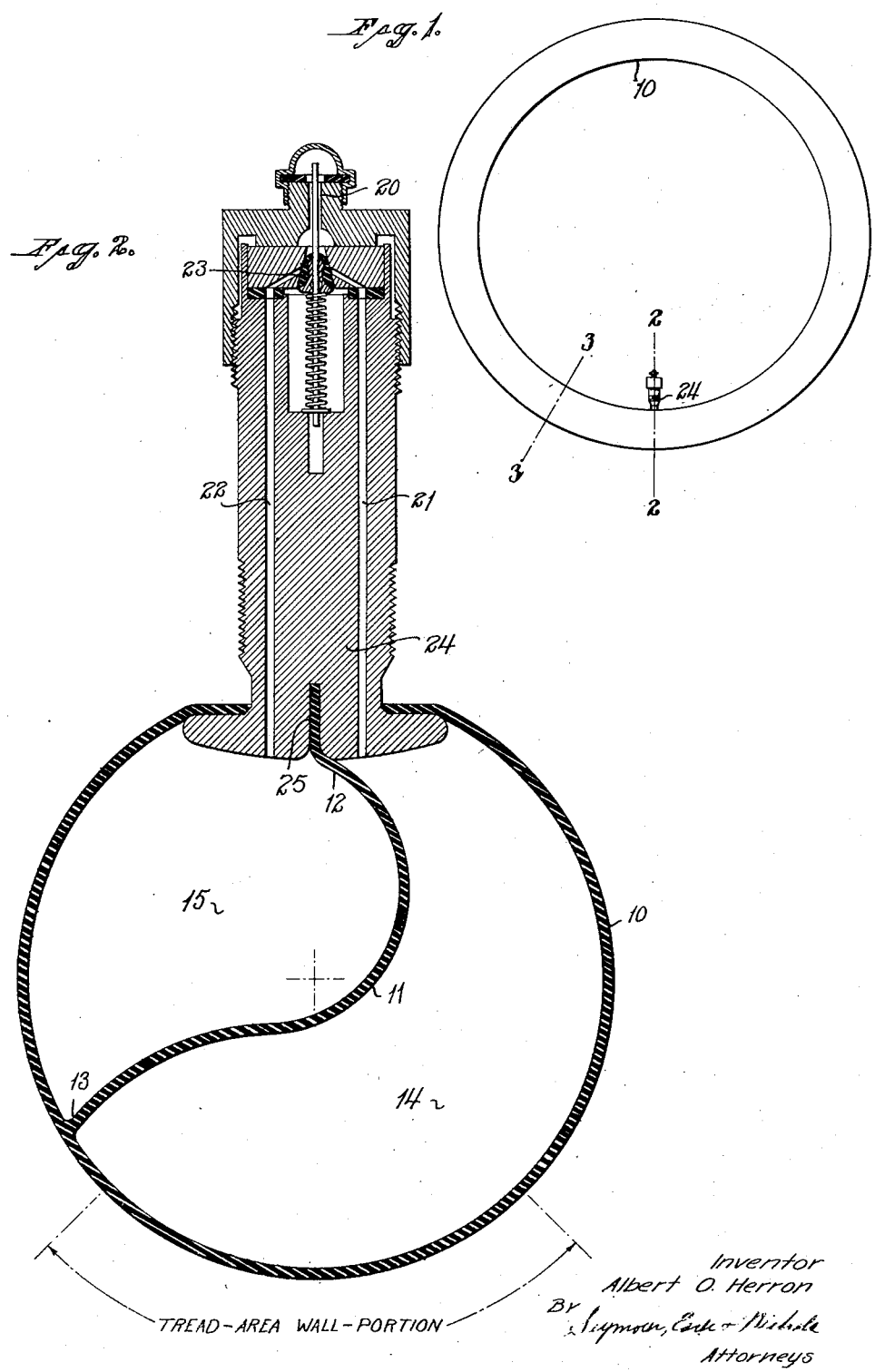

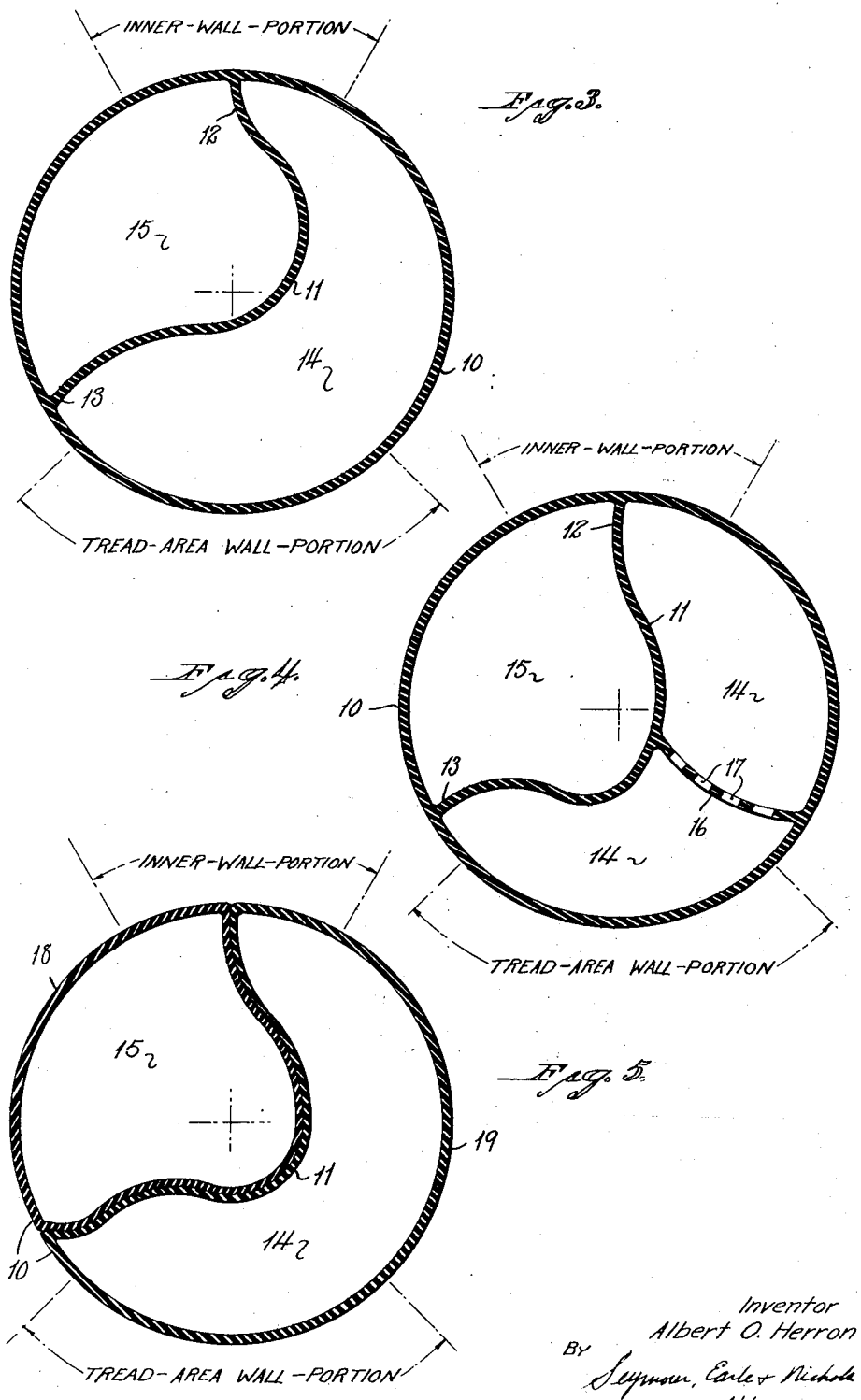

Patented May 9, 1933

1,908,244

UNITED STATES PATENT OFFICE

ALBERT O. HERRON, OF WATERBURY, CONNECTICUT

INNER TUBE FOR VEHICLE TIRES

Application filed September 5, 1931. Serial No. 561,409.

This invention relates to improvement in inner tubes for vehicle tires and particularly to that class of inner tubes having multiple air-compartments intended to minimize the dangers incident to punctures or blowouts.

I am fully aware that many efforts have been made prior to my invention to provide multiple-compartment tubes for the purpose referred to, but such previous efforts have fallen so far short of practicability as to have failed of both expert and public approval and hence, so far as I have been able to ascertain, have failed of commercial success. Having made a careful study of prior types of multiple-compartment tubes and having discovered the fundamental defects inherent in their design, I have evolved the present multiple-compartment inner tube presented herein, which has met with enthusiastic approval by tire engineers and manufacturers as having obviated the inherent defects in previous designs of such tubes.

The main object of my invention is to provide a multiple-compartment inner tube so constructed that while convenient for use and readily inflatable, minimizes to a marked degree the danger of the simultaneous rupture of more than one compartment, and insures the stability of a reserve-compartment for a length of time at least sufficient to warn an operator that a puncture or other injury has occurred to the tire, so that, even under unusual circumstances, an automobile or other vehicle need not, with reasonable alertness on the part of the operator, get out of control, with possible fatal results.

I attain the above and certain other objects which will appear from the following, by a novel arrangement of a longitudinal partition within the tube so that I provide, in addition to what I shall for clarity of description refer to as a "service air-compartment" extending over the tread-area of the tube, a safety or "reserve air-compartment" entirely segregated from the tread-area, as distinguished from multiple service-compartments, all available for rupture from injuries occurring to the tread-area of the tube.

In the accompanying drawings:

Fig. 1 is a view in side elevation of a multiple-compartment inner tube constructed in accordance with my invention;

Fig. 2 is a transverse sectional view thereof taken on the line 2—2 of Fig. 1 but on a larger scale;

Fig. 3 is a transverse sectional view taken on the line 3—3 of Fig. 1 but on a larger scale;

Fig. 4 is a transverse sectional view corresponding to Fig. 3 but showing a slight modification in which a reinforcing web extends between the partition and the tube-wall; and Fig. 5 is a transverse sectional view corresponding to Fig. 3 but showing the formation of the tube by means of two sections assembled together and preferably united by cementing or vulcanizing.

In the embodiment of my invention herein chosen for illustration, I employ an inner tube 10 having the usual ring-like form and of substantially circular form in cross-section. Extending longitudinally of the tube is a flexible partition 11 having its inner edge 12 joining the wall of the tube proper at a point substantially in the central radial plane of the tube and its opposite or outer edge 13 joining the wall of the tube at a point to one side of the tread-area of the tube, so as to be substantially immune to the effects of punctures or other weaknesses developing in the said tread-area.

The joining of the partition, according to my invention, thus creates a service air-compartment 14 and a reserve air-compartment 15.

Now it will be noted that the service air-compartment 14 extends over the tread-area of the tube and will, therefore, be subject to punctures and blow-outs incident to ordinary service, and further—and very important—that the reserve air-compartment 15 is segregated from the tread-area of the tube by the partition 11 owing to the novel arrangement of the latter, and is thus not subject to the immediate effects, at least, of punctures and blow-outs, which may exhaust the air from the service air-compartment 14.

As shown, the service-compartment 14 is enclosed by the partition 11 and the major portion of the tube-wall including the tread-area thereof, while the reserve-compartment is enclosed by the said partition and the remaining minor portion of the tube-wall exclusive of the tread-area of the latter.

If desired and as shown in Fig. 4 of the drawings, the partition 11 may be connected to the wall of the tube opposite the reserve-compartment 15 by a web 16 which is preferably provided with perforations 17 to permit the free flow of air from one side thereof to the other.

The partition 11 illustrated in Figs. 2, 3 and 4 is of a single layer, as shown, and the tube 10 is of one-piece construction, but if desired and as shown in Fig. 5, the tube proper 10 and the partition 11 may be provided by uniting two initially-independent tube-sections 18 and 19.

Air may be supplied to the respective compartments of the tube in any approved manner, such as by separate and distinct valves, though preferably and as shown in Figs. 1 to 2 I prefer to employ a single double-passage valve having a single inlet-nipple 20 to which a hose may be attached. The interior of the nipple 20 connects, as shown, with air-passages 21 and 22 respectively leading into the service air-compartment 14 and the reserve air-compartment 15 and both adapted to be simultaneously closed to prevent the escape of air by means of a check-valve 23.

The body-portion 24 of the said valve is provided at its inner end with a slit or slot 25 into which projects the localized portion of the inner edge of the partition 11 adjacent the point of the tube at which the said valve is mounted. The tube-body 24 thus straddles and embraces the edge of the partition and serves to firmly hold the same in place.

For the purpose of making clear the action of my improved inner tube when in use, let it be supposed that a blow-out has occurred in the tread-area of the shoe in which my improved tube is mounted, which blow-out would affect also the tread-area of the tube. The air from the service-compartment 14 of my improved tube would thus escape and permit the air in the reserve-compartment 15 to expand and cushion the effect of such a blow-out. It is to be borne in mind, in this connection, that for obvious reasons, such, for instance, as continued wear and incessant contact with the road, the tread-area of a tire is most subject to blow-outs and punctures, which rarely occur at places other than the tread-area.

Now it may be that when a very severe blow-out occurs in the tread-area that such blow-out may cause the partition 11 to ultimately give way through the original blow-out hole, but even if such unlikely occurrence should take place, it will occur only after a delay sufficient to pre-warn the driver and thus put him on the alert and insure proper control of the automobile, or other vehicle, before disastrous results can occur.

What I wish, therefore, to point out with emphasis is that by the novel arrangement of the service- and reverse-compartments 14 and 15, I minimize, if not preclude, the dangerous effects of a blow-out in such manner that the reserve-compartment will not be simultaneously affected with the service-compartment by a blow-out opening up the latter, as it will be noted, and as before pointed out, that the reserve-compartment is segregated from the tread-area of the tube by the novel construction and arrangement of parts above described, in distinction to multiple-compartment tubes heretofore proposed, which have had all of the said compartments available for rupture from injuries occurring to the tread-area.

It will be understood by those skilled in the art that my invention may assume varied physical forms without departing from my inventive concept, and I, therefore, do not limit myself to the specific embodiments herein chosen for illustration, but only as indicated in the appended claims.

I claim:

1. An inner tube for vehicle tires, having a longitudinal partition dividing the same into separate isolated compartments, one edge of said partition joining the tube wall adjacent to but out of the zone normally comprising the tread portion thereof and its other edge joining the tube wall directly opposite said tread portion, said partition thereby providing a compartment no portion of the wall of which includes said tread portion, and an inflation valve assembled in said tube and having a body provided with means for engagement with said partition and with separate normally-isolated passages leading to the separate compartments and a valve seat at which said passages terminate, a single valve element cooperating with said seat to open and close said passages simultaneously, and an inlet nipple affording an entrance opening to said valve, whereby said compartments though normally isolated may be simultaneously inflated.

2. The combination with an inner tube for vehicle tires having a longitudinal partition dividing the same into two air-compartments; of an air-valve having a flange-like head extending laterally therefrom and located within the said tube in position to engage the said partition, said head provided with a slit straddling and embracing said partition, and said air-valve formed with two air-passages located respectively on opposite sides of the said slit and extending into the said air-compartments respectively.

3. The combination with an inner tube for vehicle tires having a longitudinal partition dividing the same into two air-compartments, of an air-valve having a body provided with a flange-like head extending laterally therefrom and arranged within the said tube in position to engage said partition, said partition separated from said tube at that portion adjacent to the flange-like head and said head provided with a slit straddling and embracing the separated portion of said partition, said body having two air passages communicating respectively with the said two air-compartments but normally isolated from each other, a valve seat at which said passages terminate, a single valve element cooperating with said seat to open and close both of said air passages simultaneously, and an inlet nipple affording an entrance opening to said valve, whereby said compartments though normally separate may be simultaneously inflated.

In testimony whereof, I have signed this specification.

ALBERT O. HERRON.